April 14, 1931. L. JAENICHEN 1,800,637
WEIGHING SCALE
Filed Nov. 27, 1928
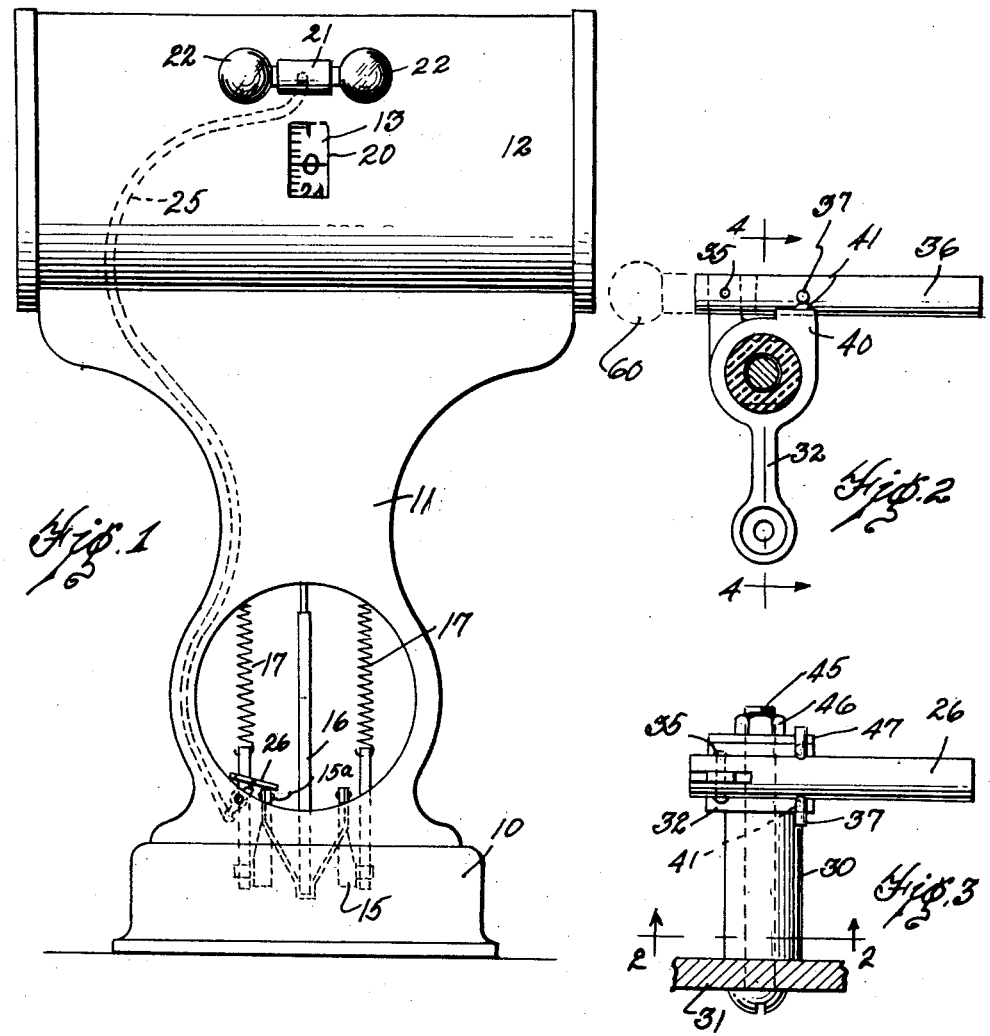
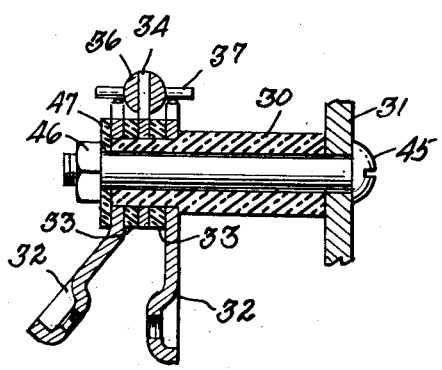
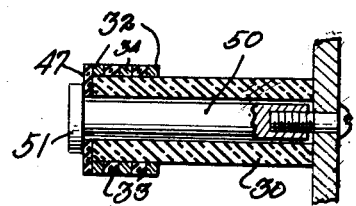
INVENTOR
Louis Jaenichen
BY
Francis D. Hardesty
ATTORNEY.

Patented Apr. 14, 1931

1,800,637

UNITED STATES PATENT OFFICE

LOUIS JAENICHEN, OF SPRINGFIELD TOWNSHIP, OAKLAND COUNTY, MICHIGAN, ASSIGNOR TO THE STANDARD COMPUTING SCALE COMPANY, A CORPORATION OF MICHIGAN

WEIGHING SCALE

Application filed November 27, 1928. Serial No. 322,260.

The present invention relates to improvements in weighing scales and more especially to improvements in means for illuminating the weight indicia and to electric switches therefor.

Among the objects of the invention is a switch of novel construction capable of easy and economical manufacture and substantially free from interference with the operation and accuracy of the scale.

Other objects will readily occur to those skilled in the art upon reference to the following description and accompanying drawings, in which Fig. 1 is a view in elevation of a counter platform scale with the back cover removed.

Fig. 2 is a sectional view of the switch on line 2—2 of Fig. 3.

Fig. 3 a plan view of the switch.

Fig. 4 is a sectional view on line 4—4 of Fig. 2 and

Fig. 5 is a section similar to Fig. 4 showing a slightly modified form of construction.

In the drawings a scale is shown in Fig. 1 as having the usual base 10 with the upright member 11 at one end thereof carrying the drum 12 within which is located a revolving cylinder 13 carrying the weight indicia.

In the platform portion will be located the usual lever system indicated at 15, which is provided with an upright rack member 16 for rotating the cylinder 13. At 17 are shown springs for resisting the movement of the levers 15 and determining the movement of the rack 16.

Opposite the port 20 through which the cylinder is visible, or adjacent to the port, is a socket 21 carrying one or more electric bulbs 22 designed to illuminate and light up the part of the cylinder visible through the port. This socket 21 is supplied with electrical current through suitable wires 25 leading within the drum 12 and upright to the switch indicated as a whole in Fig. 1 by the numeral 26.

The switch is shown in detail in Figs. 2 to 4 and is indicated as being formed of a suitable insulating supporting member 30 preferably formed of bakelite or similar material and secured to a frame member 31, which member may be any suitable stationary part, Carried by the outer end of the support 30, are two metallic connecting members 32, to one of which one of the wires 25 is connected and to the other of which is connected a wire leading from suitable source of electrical current. These two members 32 are insulated from each other by means of the insulating discs 33 lying between the members 32 and between the two discs 33 is a third metallic member provided with an upright ear 34. This ear furnishes a means to which is pivoted as by the pin 35 the movable contact member 36 which latter consists of a light rod of insulating material having extending through it the pin 37 adapted to contact with both of the members 32 when not held out of engagement therewith.

In order to prevent burning the contact points it is preferred to provide each of the members 32 with a vertical ear 40 and in each of the ears 40 is mounted a contact piece or abutment 41 of some suitable non-arcing metal, such as silver.

The switch will be so mounted that, when the indicating cylinder 13 is resting at zero, the arm 36 will be lifted and held with the pin 37 out of engagement with the contacts 41. As soon, however, as a slight weight is placed upon the scale the arm 36 is allowed to drop and bridge the gap between the contact points thus establishing the circuit through the socket 31 and bulb or bulbs 22.

In Fig. 4 the switch is shown as being mounted on the frame member 31 by passing a bolt 45 through the supporting member 30 insulating the nut 46 from the member 32 by means of an insulating washer 47.

As indicated in Fig. 5 the supporting of the switch may be accomplished by fixing in the member 30 a core 50 having its head 51 insulated from the contact member 32 by a washer 47 and provided at its other end with a threaded axial opening to receive a scrw 52 which serves to hold it in position.

Fig. 1 shows the switch adapted to be operated by one of the ends 15a of one of the weighing levers but it should be understood that other suitable movable parts may be used for this purpose.

In Fig. 4, the lower ends of the elements 32 shown as cupped, and the cups are provided with threaded holes therethrough, by means of which the lead wires may be attached but it should be understood that any other suitable means may be used for securing the wires.

Further, if found desirable, a counterbalancing weight 60 may be attached to the rear end of the arm 36 so that the weight holding the contacts together will be reduced to a minimum. However, in most cases this is not necessary as the arm 36 may be made of such light construction that a very insignificant weight on the scale will move the members sufficiently to cause the contacts to come together.

Now having described the invention and the preferred form of embodiment thereof, it is to be understood that the said invention shall be limited not to the specific details herein set forth, but only by the scope of the claim which follows.

I claim:

In a scale provided with an electric bulb adapted to be lighted to illuminate the weight indicia, a switch including a pair of spaced stationary contacts insulated from each other, a conducting element pivotally mounted on a fixed portion of said scale and adapted to bridge said contacts to electrically connect them to each other, and a movable arm normally maintaining said conducting element out of engagement with said contacts, and adapted to be moved when load is applied to said scale, to a position wherein it will permit said conducting element to engage and bridge said contacts.

LOUIS JAENICHEN.